(12) United States Patent
Hüppi

(10) Patent No.: US 6,554,336 B2
(45) Date of Patent: Apr. 29, 2003

(54) METHOD AND APPARATUS FOR GRASPING ITEMS

(75) Inventor: Emil Hüppi, Uhwiesen (CH)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/876,114

(22) Filed: Jun. 8, 2001

(65) Prior Publication Data

US 2001/0050488 A1 Dec. 13, 2001

(30) Foreign Application Priority Data

Jun. 8, 2000 (CH) .............................................. 1132/00

(51) Int. Cl.$^7$ .............................. B66C 1/02; B25J 15/06
(52) U.S. Cl. ........................................ 294/64.1; 901/40
(58) Field of Search .................... 294/64.1, 65; 15/344; 269/21; 279/3; 414/737, 752; 901/40

(56) References Cited

U.S. PATENT DOCUMENTS

| | | | |
|---|---|---|---|
| 3,368,324 A | | 2/1968 | Leedy |
| 3,387,718 A | * | 6/1968 | Roth et al. ............. 294/64.1 X |
| 4,071,149 A | | 1/1978 | Deguchi |
| 4,639,030 A | * | 1/1987 | Bini .......................... 294/64.1 |
| 4,850,627 A | * | 7/1989 | Franklin ................ 294/64.1 X |
| 4,858,975 A | * | 8/1989 | Ogawa ....................... 294/64.1 |
| 5,088,878 A | * | 2/1992 | Focke et al. ........... 294/64.1 X |
| 5,251,919 A | * | 10/1993 | Summers ............... 294/64.1 X |
| 5,388,879 A | * | 2/1995 | Sekiguchi et al. ......... 294/64.1 |
| 5,457,933 A | | 10/1995 | LaVars et al. |
| 5,516,125 A | * | 5/1996 | McKenna ............. 294/64.1 X |
| 5,833,287 A | * | 11/1998 | Shade ....................... 294/64.1 |
| 6,182,814 B1 | | 2/2001 | Koehler |

FOREIGN PATENT DOCUMENTS

| | | |
|---|---|---|
| DE | 39 06 634 | 9/1990 |
| EP | 0 084 479 | 7/1983 |
| EP | 0 526 403 | 2/1993 |
| EP | 0 532 774 | 3/1993 |
| FR | 1548318 | 10/1968 |

* cited by examiner

Primary Examiner—Dean J. Kramer
(74) Attorney, Agent, or Firm—Venable, LLP; Robert Kinberg; Stuart I. Smith

(57) ABSTRACT

A suction gripper for lifting, transporting and depositing items, includes a basic suction body having an inner surface; a first opening for coupling the basic suction body to a suction source; and a second opening through which an item is introduced into the basic suction body by suction. An abutment member is positioned within the basic suction body between the first and second openings such that a clearance is defined between the abutment member and the inner surface of the basic suction body for allowing a suction stream to pass from the second opening through the clearance into the first opening. A storage chamber is defined between the inner surface of basic suction body, the second opening and the abutment member for accommodating an item drawn thereinto and held against the abutment member by suction.

16 Claims, 3 Drawing Sheets

METHOD AND APPARATUS FOR GRASPING ITEMS

CROSS REFERENCE TO RELATED APPLICATION

This application claims the priority of Swiss Application No. 2000 1132/00 filed Jun. 8, 2000, which is incorporated herein by reference.

BACKGROUND OF THE INVENTION

This invention relates to a gripper apparatus for grasping articles and is of the type which includes a basic suction body to which vacuum is applied and which is provided with a suction opening to be aligned with a surface of the article to be grasped and further includes a vacuum source coupled to the basic suction body.

A gripper of the above-outlined type, as described, for example, in German patent document 39 06 634, can simultaneously pick up a plurality of items with a plurality of suction heads. This apparatus, however, is not capable of picking up with one suction head simultaneously or consecutively several items for forming an item group.

European Patent No. 0 532 774, to which corresponds U.S. Pat. No. 5,263,753, describes a further gripping apparatus in which the suction opening has four circumferentially arranged gripping arms and which, by exposing a diaphragm coupled thereto with vacuum, swing towards the item to be grasped and capture the same in a centered manner. A plurality of items cannot be simultaneously grasped with such a gripper.

U.S. Pat. No. 5,457,933 describes a gripping apparatus for grasping fruit. The apparatus includes a matrix of suction grippers which simultaneously grasp fruits arranged in a pattern and deposit the same at another location. The items are arranged side-by-side in rows and are grasped by a plurality of grippers.

Further, U.S. Pat. No. 3,368,324 describes a gripping apparatus for baked goods. The apparatus is particularly designed for handling items having a delicate upper, not necessarily planar, product surface to be grasped by the suction gripper.

SUMMARY OF THE INVENTION

It is an object of the invention to provide an improved gripper apparatus of the above-outlined type which grasps the articles in a gentler manner while permitting an accelerated packing rate. In particular, it is an object of the invention to form a group of articles such as edible wafers (for example, flat confectionary items) and to increase the packing speed in this manner without relinquishing a gentle handling of the items.

This object and others to become apparent as the specification progresses, are accomplished by the invention, according to which, briefly stated, the suction gripper for lifting, transporting and depositing items includes a basic suction body having an inner surface; a first opening for coupling the basic suction body to a suction source; and a second opening through which an item is introduced into the basic suction body by suction. An abutment member is positioned within the basic suction body between the first and second openings such that a clearance is defined between the abutment member and the inner surface of the basic suction body for allowing a suction stream to pass from the second opening through the clearance into the first opening. A storage chamber is defined between the inner surface of the basic suction body, the second opening and the abutment member for accommodating an item drawn thereinto and held against the abutment member by suction.

By providing that the basic suction body has a height which is greater than the article to be grasped, an item group may be directly formed in the storage chamber.

A method for using a gripping apparatus of the above-outlined construction according to the invention includes the steps of picking up sequentially a plurality of items by the gripper apparatus and while vacuum is continuously applied in the basic suction body of the gripping apparatus, the items are intermediately stored. The temporarily stored item groups are subsequently deposited onto or into a device which moves away the grouped items.

Thus, since first a number of items are picked up from the supply conveyor and are then deposited as a group on the removing conveyor or in a package, the displacement paths are significantly reduced, and consequently the apparatus may operate more rapidly and more efficiently.

The items handled by the gripper apparatus according to the invention may be, in particular, wafer-shaped items, such as baked products like biscuits, frozen dough pieces, muffins, madeleines or similar products.

DESCRIPTION OF THE PREFERRED EMBODIMENTS

Figure 1:
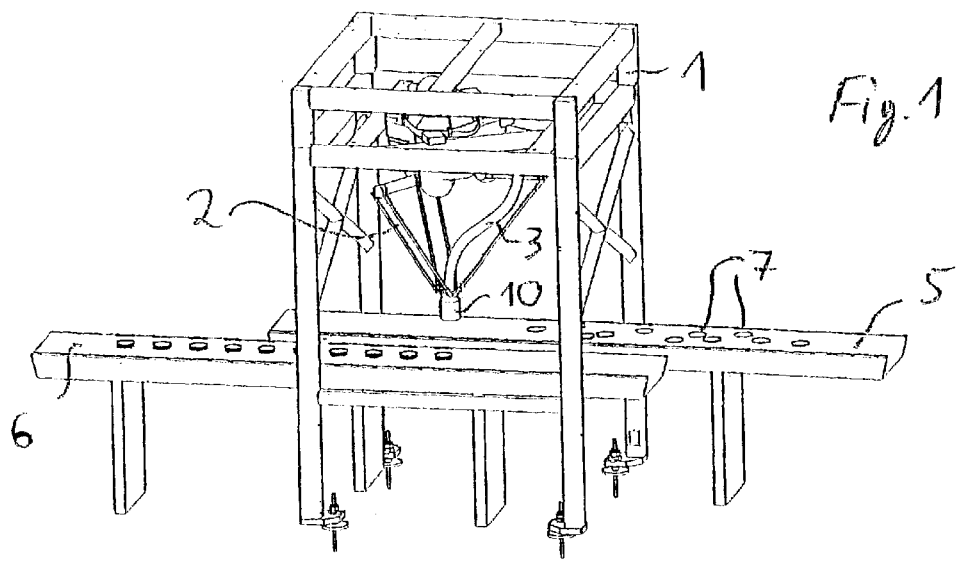
FIG. 1 is a schematic perspective view of a gripper apparatus according to the invention.

FIG. 1 schematically shows a gripper apparatus for forming groups, including a frame 1 and a pickup device 2 mounted thereon. The pickup device 2 has three arms, at the lower end of which a suction device 10 is secured and coupled to a vacuum hose 3. The suction device includes an outer cylinder jacket 11 shown in more detail in FIG. 2 and also referred to below as a basic suction body.

FIG. 1 further shows two conveyor belts 5 and 6 which move leftward as viewed in FIG. 1. On the first conveyor belt 5 items 7, such as edible wafers are arranged in an organized or random manner and are advanced into the zone of the frame 1 and thus arrive in the grasping range of the pickup device 2, In the illustrated embodiment the items are randomly arranged edible waters 7, for example, circular crackers. The suction device 10 to be described below may also be utilized for other types of items, for example, oval edible wafers 7, baked goods of irregular shape such as muffins or madeleines or items other than food products. The suction device 10 is capable of handling glazed items, or food products having adhering fragments such as almond slivers or hard, soft, or irregular surfaces.

The second conveyor belt 6 moves away the items 7, deposited by the suction device 10 individually or as item stacks, from the region of the stand 1 and may be subsequently placed into packaging containers.

Figure 2:
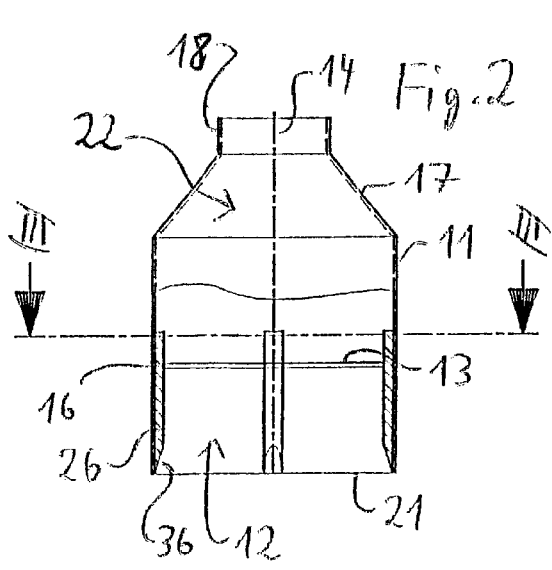
FIG. 2 is a sectional elevational view of the suction device forming part of the gripper apparatus according to the invention.

FIG. 2 shows that the suction device 10 has a cylindrical storage chamber 12 defined by the basic suction body 11 which may be of plastic, particularly a food-compatible plastic The items 7 are drawn into the chamber 12 by suction. The cylindrical chamber 12 is adapted to accommodate cylindrical edible wafers 7, particularly baked products and other items which have a volume that may be surrounded by basic suction body 11.

Figure 3:
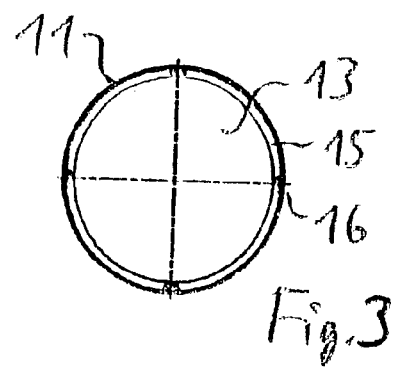
FIG. 3 is a sectional view taken along line III—III of FIG. 2.

Also referring to FIG. 3, a septum 13 is disposed perpendicularly to the longitudinal axis 14 of the suction device 10. The septum 13 is a circular disk whose diameter is slightly less than the inner diameter of the basic suction body 11, whereby a narrow annular clearance 15 is formed. Given a diameter of 10 cm for the basic suction body 11, the clearance 15 may be, for example, between 2 and 5 mm. The septum 13 is secured to the jacket 11 by four supports 16 circumferentially spaced at 90° from one another.

The cylindrical jacket 11 terminates in a coupling nipple 18 with a tapered portion 17 which defines a suction chamber 22 adjoining the storage chamber 12. By means of the tapered portion 17, optionally in conjunction with a cone, a laminar gas flow may run through the clearance 15 and into the coupling nipple 18 through the suction chamber 22 defined by the tapered jacket portion 17.

The four supports 16 are integrated into wedge-shaped ribs 26 which taper at their lower end and merge smoothly into the lower portion and terminal edge 21 of the basic suction body 11. The ribs 26 serve as centering means for the items 7 to be drawn in by suction to ensure that the air gap 15 is securely preserved about the items 7.

Figure 2A:
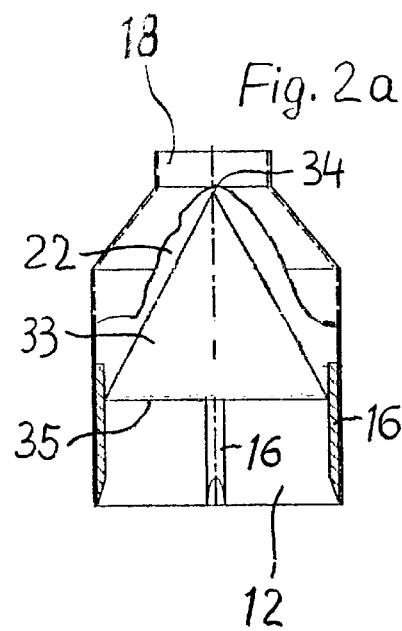
FIG. 2a is a schematic perspective view of a variant of the structure shown in FIG. 1

Referring to FIG. 2a, instead of the septum disk 13 a cone 33 is provided whose point 34 is located in the suction chamber 22, in the vicinity of the coupling nipple 18, The cone 33 has a base 35 oriented toward the storage chamber 12 and serving as a counter support for the items 7 drawn into the storage chamber 12.

Figure 4:
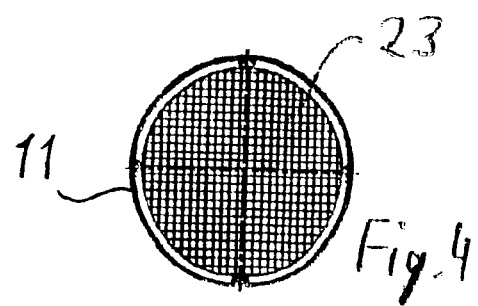
FIG. 4 is a view similar to FIG. 3, illustrating a variant.
Figure 5:
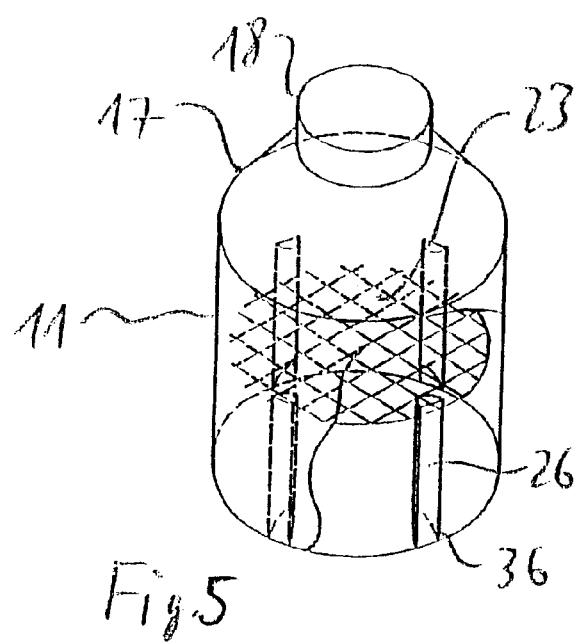
FIG. 5 is a schematic perspective view of the suction device including the component shown in FIG. 4.

FIGS. 4 and 5 show a second embodiment which has a sieve or grid 23 instead of a septum 13. Thus, in case the suction device 10 is empty, the open suction passage cross section is significantly larger in the embodiment according to FIG. 4 than in the embodiment according to FIG. 3.

Figure 6:
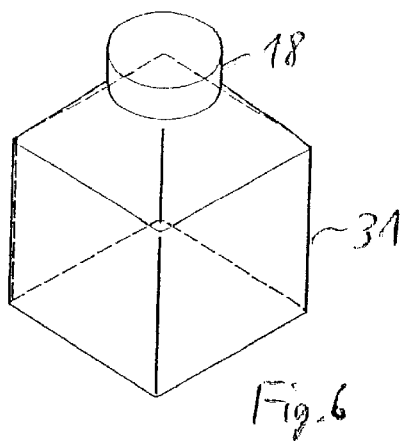
FIGS. 6 and 7 and are schematic perspective views of two further preferred embodiments of the suction device according to the invention.

In the suction device shown in FIG. 6 the basic suction body is formed by a quadratic jacket 31 for receiving flat, square items. The suction device shown in FIG. 7 has a heart-shaped jacket 41 for receiving flat, heart-shaped items.

Figure 7:
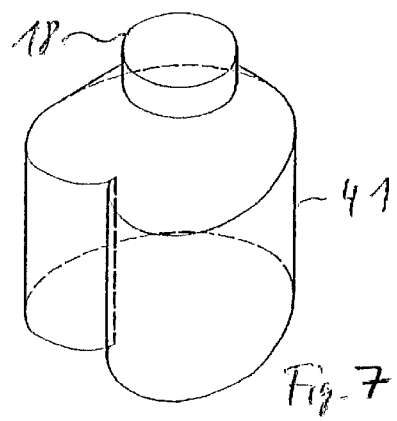

FIGS. 6 and 7 illustrate two exemplary configurations of the cross-sectional outlines of the jackets 31 and 41 of the suction device By means of the identically structured respective coupling nipple 18 a rapid exchange of the pick-up device is possible for products of any desired shape.

The suction devices structured according to the invention, particularly according to one of the above-described embodiments, operate identically. In particular, the diameter of the septum 13 or the screen 23 is of the same size as the diameter of the item to be handled so that the suction surface is greater than the item surface engaging the septum 13 or the screen 23, When the lower, terminal edge 21 of the jacket 11 is moved over an item 7 and a vacuum prevails in the storage chamber 12 by virtue of an air stream flowing from the chamber 12 through the annular clearance 15 and the nipple 18, the vacuum force lifts the item 7 off the conveyor belt 5 and subsequently the item 7 moves between the walls of the jacket 11 in a centered manner guided by the ribs 26 in the direction of the septum 13. After the first item is drawn in by suction, it rests against the face of the septum 13 and is, by the continuing suction, held in that position. The septum 13 serves an abutment member for the item 7 and may be provided with an adherence-repellent coating. The vacuum prevailing at the annular clearance 15 continues to be maintained through the annular space formed between the jacket 11 or 31 or 41 on the one hand and the item 7 on the other hand and draws a further item 7 into the storage chamber 12. Such a second item and additional items (for example, up to four items) are held in a stacked relationship in the jacket 11 or 31 or 41 (the basic suction body) which thus has a height that is a multiple of the item thickness. This arrangement results in a superior efficiency, since the product groups in the suction device are formed within the basic suction body and may be subsequently deposited as a unit. Further, for each group the displacement path which the suction head of the pickup device has to travel is shortened compared to conventional pickup devices. This is so because during group formation the suction head has to travel only short distances above the conveyor belt 5 to consecutively gather the items 7 to form a group within the storage chamber 12, and after the item group is formed, the suction head has to travel only once the back-and-forth distance to deposit the item group on the conveyor 6.

In using the suction device 10 for such a process, the lower edge of the jacket 11 representing the basic suction body) is moved according to a predetermined pattern at a constant distance above the items 7 to be picked up from the conveyor belt 5. In the simplest case such a movement is a back-and-forth displacement in a direction transversely to the advancing direction of the conveyor belt 5. Such a motion may also be effected by a control, based on signals emitted by a camera capturing the position of the items 7 carried by the conveyor belt 5. Thus, according to a predetermined pattern the suction device 10 is always moved to that item which is nearest to the end of the gripping zone in the direction of movement of the conveyor 5. Further according to such a pattern, the control device operating the suction device 10, knowing the quantity X of items which the storage chamber 12 of the suction device 10 can accommodate, calculates the minimum distance to grasp the quantity X of items which are nearest to the end of the gripping zone in the direction of movement of the conveyor 5. By counting the drawn-in items 7 through transparent walls of the jacket 11 or by other means it may be determined that the group is complete and then the group may be moved to the second conveyor belt 6 to be deposited thereon, Such a deposition of the items may be, for example, at uniform distances as shown in FIG. 1.

The items 7 may be delicate food products, such as confectionery items with almond sliver topping or decorative, sugar based coatings, such as glaze. In general, these products may be characterized as having a particle topping. During the suction process the upper item surface abuts the suitably coated and/or yielding underside of the septum 13. The coating of the septum 13 may be, for example, Teflon or a microcellular rubber layer or the septum 13 may be resiliently suspended, preferable in combination with motion damping.

Figure 8:
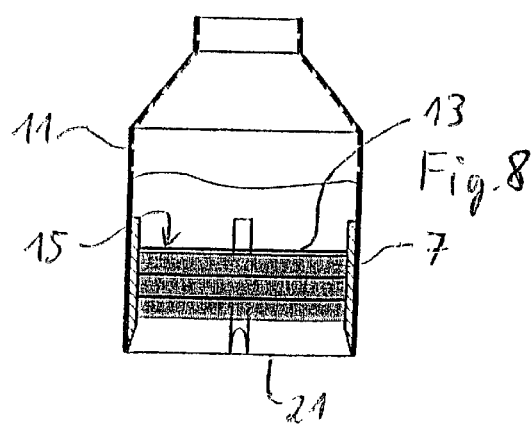
FIG. 8 is a schematic sectional side elevational view similar to FIG. 2, showing three drawn-in items stored in the suction device.

FIG. 8 shows a suction device according to FIG. 2, containing three superposed, drawn-in items 7 which rest against the underside of the septum 13. The height of the jacket 11 permits the admission of a fourth item 7. During the entire suction process and transport of the grouped items 7 to the second conveyor belt 6 vacuum is continuously applied to the coupling nipple 18 so that by virtue of the continuous air flow at the edges of the items 7 and through the annular clearance 15, the items 7 are held in their position shown in FIG. 8.

Apart from the above-described possibility of grouping of a plurality of food items, it is also feasible to move by suction an individual delicate product. Such product may be, for example, a muffin or a madeleine in which case the septum 13 has to be of arcuate configuration to conform to the surface of the item. Further, the described suction gripper according to the invention is capable of grasping and lifting a previously formed item group as a whole.

It will be understood that the above description of the present invention is susceptible to various modifications, changes and adaptations, and the same are intended to be comprehended within the meaning and range of equivalents of the appended claims.

What is claimed is:

1. A suction gripper for lifting, transporting and depositing items, comprising
   (a) a basic suction body having
      (1) an inner surface;
      (2) a first opening for coupling said basic suction body to a suction source; and
      (3) a second opening through which an item is introduced into the basic suction body by suction;
   (b) an abutment member positioned within said basic suction body between said first and second openings and being secured to the basic suction body by supports integrated into ribs, the ribs being affixed to said inner surface;
   (c) a clearance defined between said abutment member and said inner surface for allowing a suction stream to pass from said second opening through said clearance into said first opening; and
   (d) a storage chamber defined between said inner surface, said second opening and said abutment member for accommodating an item drawn thereinto and held against said abutment member by suction.

2. The suction gripper as defined in claim 1, wherein the gripper comprises at least three of said ribs as centering members and the centering members are affixed to said inner surface in a uniformly spaced circumferential array; each said centering member extending from said second opening at least to said abutment member.

3. The suction gripper as defined in claim 2, wherein the centering members taper at their lower end and merge into a terminal edge of the basic suction body.

4. The suction gripper as defined in claim 1, wherein said abutment member comprises a sieve.

5. The suction gripper as defined in claim 1, wherein said basic suction body is plastic.

6. The suction gripper as defined in claim 1, wherein said basic suction body is a foodstuff-compatible plastic.

7. The suction gripper as defined in claim 1, wherein said basic suction body is at least partially transparent.

8. The suction gripper as defined in claim 1, wherein said abutment member has a face oriented toward said second opening; said face being coated by an adherence-repellent material.

9. The suction gripper as defined in claim 1, wherein said basic suction body has an outline conforming to an outline of an item to be handled by said suction gripper.

10. The suction gripper as defined in claim 1, wherein said basic suction body tapers toward said first opening from a location between said first opening and said abutment member.

11. The suction gripper as defined in claim 1, wherein said abutment member is conical and tapers toward said first opening to provide a laminar air flow from said clearance to said first opening.

12. A method of operating a suction gripper as defined in claim 1, comprising the following steps:
   (a) maintaining an air stream entering said second opening and exiting said first opening;
   (b) while performing step (a), consecutively picking up a plurality of items from a first location;
   (c) while performing step (a), storing the plurality of items as a stack in said storage chamber, while holding said stack against said abutment member by a force of said air stream; and
   (d) depositing the item stack on a second location.

13. A method as defined in claim 12, wherein said step (b) comprises the step of moving said basic suction body such that said second opening travels above items to be picked up in a predetermined pattern.

14. The suction gripper as defined in claim 1, wherein said abutment member comprises a solid plate.

15. The suction gripper as defined in claim 1, wherein the abutment member has a diameter which is of the same size as the diameter of the item to be handled and is smaller than an inner diameter of the basic suction body.

16. The suction gripper as defined in claim 1, wherein the basic suction body has a jacket with a cross-sectional outline which is one of circular, quadratic, and heart-shaped.

* * * * *